BINARY PULSE MODULATOR

Filed Jan. 7, 1957 2 Sheets-Sheet 1

INVENTOR.
JOHANN HOLZER
BY
Harry M. Saragovitz
ATTORNEY

Nov. 4, 1958 J. HOLZER 2,859,408

BINARY PULSE MODULATOR

Filed Jan. 7, 1957 2 Sheets-Sheet 2

INVENTOR.
JOHANN HOLZER

BY

Harry M. Saragovitz
ATTORNEY

United States Patent Office 2,859,408

Patented Nov. 4, 1958

2,859,408

BINARY PULSE MODULATOR

Johann Holzer, Long Branch, N. J., assignor to the United States of America as represented by the Secretary of the Army Application January 7, 1957, Serial No. 632,950

9 Claims. (Cl. 332—11)

(Granted under Title 35, U. S. Code (1952), sec. 266)

The invention described herein may be manufactured and used by or for the Government for governmental purposes, without the payment of any royalty thereon.

This invention relates to electrical intelligence signal transmission systems and more particularly to an improved delta-type modulation system.

Delta modulation is defined as a type of modulation in which the signal to be modulated is sampled in time and the difference between two adjacent samples is translated into a code. Such a modulation system employs the one-digit binary or unit code and may be considered as a pulse frequency modulation system in which the time between pulses is quantized and in which the frequency of the output pulse series is proportional to the first derivative of the function of time of the input information signal. A quantized signal approximating the form of the modulating signal is generated and compared with the modulating signal at successive time intervals in a manner such that if the aproximated quantized signal is smaller than the input signal, a pulse is transmitted and the amplitude of the approximated signal is increased a prescribed amount to the next higher quantum level. But if the approximated signal is larger than the input signal, the pulse is suppressed and the approximated signal is decreased to the next lower quantum level. The approximated signal is also reconstructed at the receiver as the received pulses pass through an integrator. Such modulation systems comprise rather complex circuitry and have proven to be rather difficult to design. One such modulation system is described in Philips Technical Review, March 1952, pages 237–245. Besides being complex, a serious disadvantage of such a system and other similar systems operating on the delta modulation principle is that any errors at the receiver caused by incorrect interpretation of the intended amplitude of a transmitted pulse will be cumulative in nature. For example, if there is interference which at the receiving end causes a false interpretation of some pulses and spaces, the errors will accumulate and the direct-current level at the receiver will, with time, increase or decrease indefinitely. The deleterious effects of such cumulative errors is readily apparent inasmuch as these errors will cause the quantum level at the receiver to be shifted to incorrect or different quantum levels which may approach amplitudes beyond which the receiver may not respond. Another apparent limitation in the application of conventional delta modulation systems is that it is not possible to distinguish between different amplitude levels of direct-current signals.

It is therefore an object of the present invention to provide an improved delta-type modulation circuit wherein such limitations are overcome.

It is another object of the present invention to provide a simple yet more efficient delta-type modulation system where the quality of the received signal is greatly improved.

It is still another object of the invention to provide a simple delta-type modulation system wherein every direct-current level provides a discrete code output.

It is a further object of the present invention to provide a delta-type modulator wherein errors due to incorrect interpretation at an intended receiver are not cumulative.

In accordance with the present invention there is provided a modulator system which includes a source of input signals $f(t)$ and means for quantizing the input signals in time in accordance with a signal $+Q(t)$. Also included is a non-linear active device including means for simultaneously generating a voltage pulse and a current pulse at its output and input, respectively, when triggered into conduction by a trigger signal $g(t)>0$. Included further is a passive coding network in circuit with the input to the non-linear device and responsive to the current pulses drawn by the non-linear active device to develop a voltage signal $h(t)$ of negative polarity with respect to the quantizing signal and having exponential voltage steps between conduction periods of the non-linear active device. The voltage $-h(t)$ on the coding network is periodically sampled by the quantized signal $[f(t)+Q(t)]$ and at times when $-h(t)<[f(t)+Q(t)]$, the non-linear active device is triggered into conduction. The recurring rate of the trigger pulses is a function of the amplitude and derivative of the input signal $f(t)$.

For a better understanding of the invention together with other and further objects thereof, reference is had to the following description taken in connection with the accompanying drawings in which.

Figure 1:
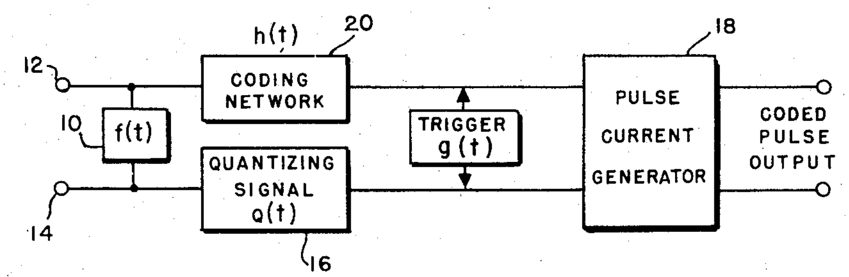
Fig. 1 is a block diagram of the present invention.

Fig. 1 is a block diagram illustrating the broad concept of the invention. Block 10 represents the total input signal $f(t)$ which is applied across the input terminals 12 and 14 and quantized in time by the signal $Q(t)$ represented by the block 16. The quantized input signal $f(t)+Q(t)$ is applied to a pulse current generator 18 through a pulse coding network 20 comprised of passive elements having a prescribed impulse response function. Pulse generator 18 is a non-linear active device which, when rendered conductive, develops an output pulse and simultaneously generates current pulses at the pulse generator input terminals, such that a signal $h(t)$ is developed across coding network 20. The parameters of the pulse generator are chosen such that it is rendered conductive to produce a modulator output pulse only when its input trigger signal $g(t)=[f(t)+Q(t)]-h(t)>0$.

The impedance of source $f(t)$ is such that for a prescribed coding network and a prescribed non-linear active device, the current pulses will be of a value so as to be able to develop a magnitude of $h(t)$ which will satisfy the equation $|h(t)|_{max} \geqslant |(f)t|_{max}$.

Figure 2:
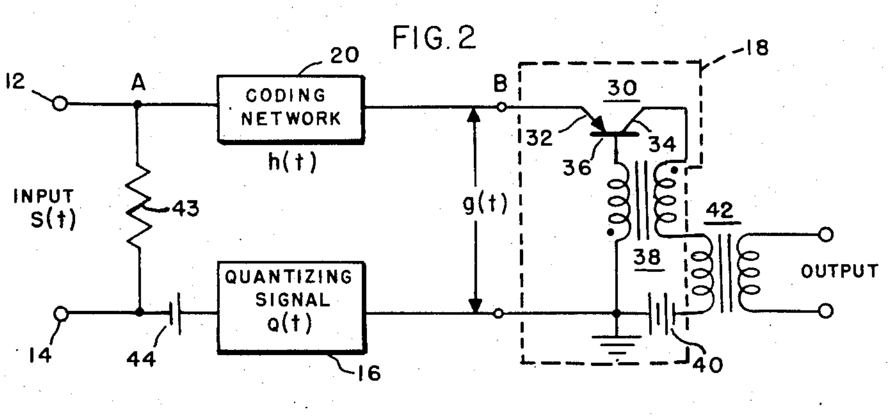
Fig. 2 is diagram, partly schematic, illustrating a preferred embodiment of the present invention.
Figure 4:
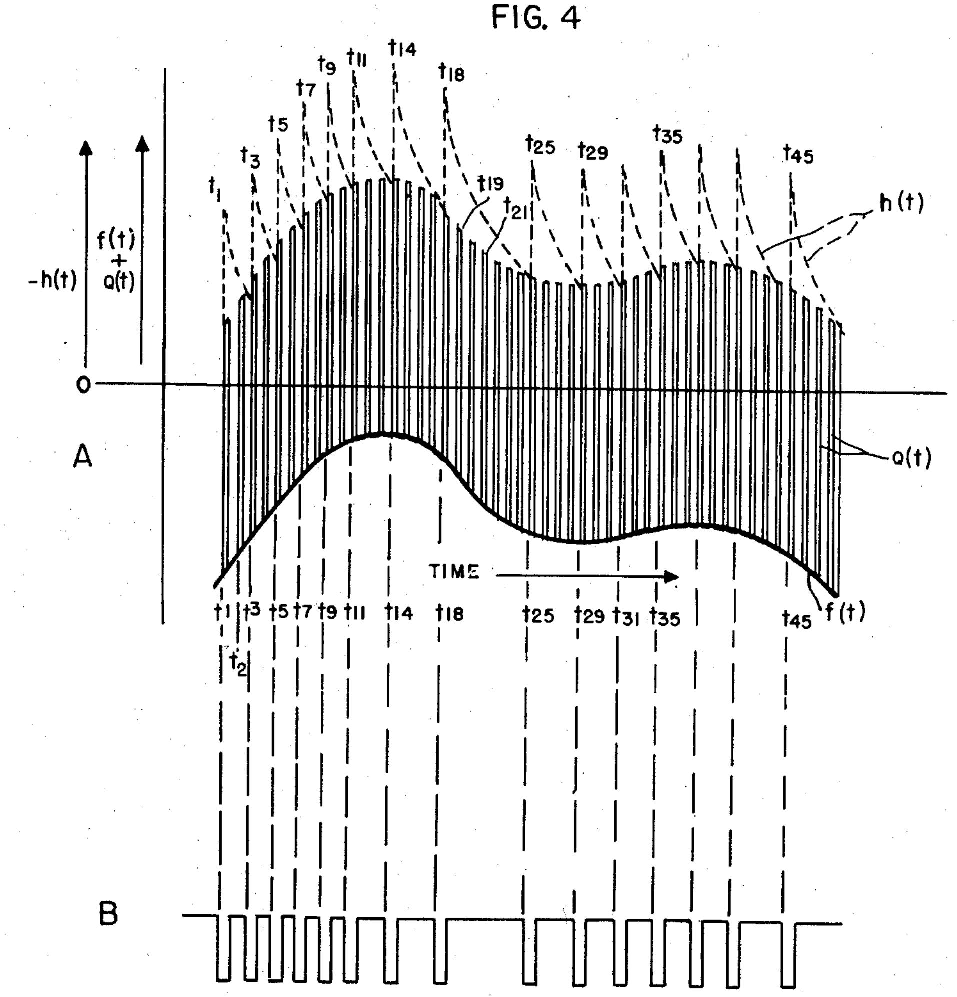
Figs. 4A and 4B are explanatory curves illustrating the operation of the present invention.

Referring now to detailed schematic of Fig. 2, where like numerals refer to like elements, the pulse current generator 18 comprises transistor 30 having an emitter 32, a collector 34, and a base 36. Transistor 30 may, for example, be a point-contact transistor having an N-type semi-conductive body as indicated by the accepted schematic symbol used therefor. However, it is to be understood that a point-contact transistor having a P-type semi-conductive body may be used by reversing the applied bias voltages hereinafter described. Base electrode 36 is connected to ground through a low potential or primary winding of impedance changing transformer 38. One end of the high potential or secondary winding of transformer 38 is connected to collector 34 while the other end is connected to one terminal of collector battery 40 through the primary winding of output pulse transformer 42. Emitter 32 is connected to input terminal 12 through a passive coding network 20 which has a prescribed impulse response function. The other input terminal 14 is connected to one terminal of emitter battery 44 and the quantizing signal source 16 is connected between emitter battery 44 and ground. Quantizing signal source 16 may comprise any of the well known conventional sampling pulse producing generators well known in the art. Although it is preferable that the quantizing generator 16 produce narrow rectangular pulses as shown in Fig. 4, it is to be understood that other suitable quantizing pulses could be utilized. In accordance with well known principles, the width of the quantizing pulses used should be small compared to the recovery time of the pulse current generator 18 and the rise time should be small with respect to the time between adjacent quantizing pulses. Battery 44 is poled to bias the emitter in the reverse direction and battery 40 is poled to bias the collector also in the reverse direction. Transformer 38 is connected with the polarity of its windings opposite so that it will couple an inverted collector pulse back to the base at an impedance level comparable to the base impedance. The signal $f(t)$ shown in Fig. 1 is the total input signal which comprises $s(t)$, the input signal applied to terminals 12 and 14 and $E_b$, the reverse bias supplied by emitter battery 44. The quantizing signal output from source 16 applied to the signal $f(t)$ is a positive pulse, the amplitude of which is chosen so that in all instances $f(t)+Q(t)$ must be greater than zero.

With no input signal applied to terminals 12 and 14, the transistor circuit functions as a blocking oscillator triggered into conduction by the quantized signal applied through battery 44 and coding network 20 at a rate which is determined by the value of the emitter bias. During the "on" period the collector voltage is nearly at ground, the base is held negative by pulse transformer 38, and coding network 20 is charged negatively by the emitter current. The emitter current path is completed through coding network 20, through the input circuit $s(t)$ schematically represented by the resistance 43 connected across the input terminals 12 and 14, through quantizing signal source 16 and through the primary of transformer 38 to base 36. The conducting state of the transistor 30 will last for a duration is determined by the stored energy in the transformer 32 or by the duration of the quantizing signal, whichever is shorter. Although the emitter current is charging coding network 20 negatively during the regenerative transition, this does not affect the operation of the pulse current generater 18 since the transition time is very short compared to the charging time of the coding network. While the transistor is "on" a current pulse is generated in output pulse transformer 42. The transistor will remain "off" until its input is triggered again in time by the quantizing signal from source 16. During the interval that the transistor oscillator is "off," the negative charge on coding network 20 will tend to discharge towards zero. Since the amount and duration of the emitter current are determined by the parameters of the blocking oscillator and the impedance of the input source, which are, to a very high degree, constant, the charge across the coding network 20 will be increased by a constant amount whenever the blocking oscillator is triggered. The amount of this constant charge will of course depend on the drawn emitter current and the duration thereof.

Figure 3:
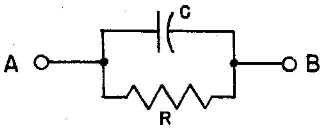
Figs. 3, 3A and 3B illustrate three types of coding networks.

For purposes of illustration, the operation of the modulator with an input signal applied thereto will be described in connection with the coding network shown in Fig. 3 which comprises a parallel arrangement of a resistor R and a capacitor C having an impulse response function which is determined by the respective values of R and C. To better understand the operation of the modulator, reference is made to Figs. 4A and 4B. In Fig. 4A the input signal designated by the curve $f(t)$ is shown quantized in time by the quantizing signal $Q(t)$ and the signal $h(t)$ is shown by the dashed curve. It is to be understood that the function $h(t)$ above the zero axis represents a negative quantity while the quantized function $f(t)+Q(t)$ above the the zero axis represents a positive quantity. Let it be assumed that at time $t_1$, the quantized input signal and the voltage $h(t_1)$ across the coding network of Fig. 3 are of such values that the oscillator is triggered into conduction and an output pulse is generated as hereinabove described. For the duration that the blocking oscillator is cut off, capacitor C discharges through resistor R towards zero in accordance with the RC time constant. Since the blocking oscillator will be triggered when $g(t)=[f(t)+Q(t)]-h(t)>0$ it follows that this trigger pulse will be present only when $-h(t)<+[f(t)+Q(t)]$ and the capacitor C will continue to discharge through resistor R until this condition is reached. Thus, whenever $-h(t)$ intersects $f(t)+Q(t)$ the blocking oscillator fires and a pulse will be generated in output transformer 38 of the transistor oscillator circuit. Whenever the blocking oscillator fires, the voltage across capacitor C is increased negatively by a constant amount and an exponential voltage step is provided between firing times. The amount of capacitor charge is a function of the current I drawn by emitter 32 in a time T both of which are determined by the parameters of the transistor blocking oscillator circuit. The points of intersection of $-h(t)$ and $f(t)+Q(t)$ are shown at times $t_3$, $t_5$, $t_7$, $t_9$, $t_{11}$, $t_{14}$, $t_{18}$, $t_{25}$, $t_{29}$, etc. and the corresponding output pulses are shown in Fig. 4B. At times such as $t_2$, $t_{19}$, and $t_{21}$, for example, no pulses are generated inasmuch as $-h(t)>[f(t)+Q(t)]$. It has been mathematically determined that the output pulse repetition rate of the Fig. 3 coding network is such that the pulse density is proportional to the sum of the amplitude of the modulating voltage and an amount which is proportional to the first derivative therof. This can be expressed mathematically as $$\text{Pulse Density}=K\left[\frac{1}{T}f(t)+f'(t)\right]$$

where T is the time constant RC of the coding network. This also indicates that it is possible to transmit direct current inasmuch as the slope function will become zero for all direct-current values. It can be seen that if $f(t)$ should extend beyond zero, the output from the transistor oscillator circuit would comprise the maximum number of pulses per unit of time or, in other words, the pulse density is at a maximum. If, on the other hand, $f(t)$ should extend below zero by a value equal to the amplitude of the quantizing signal $Q(t)$, then the pulse density will be zero, that is, no output pulses will be derived from the transistor oscillator circuit. This latter condition corresponds to a sequence which consists only of spaces while the former condition corresponds to a sequence which consists of only pulses. All direct-current values between these two limits can be obtained by different combinations of pulses and spaces. To detect such a coded pulse it would only be necessary to provide an integrating network having the same impulse response function as the coding network chosen. In view of the exponential steps shown at $h(t)$, it is apparent that if a transmitted pulse signal were to be misinterpreted at the receiver, the error which is caused by this signal will decrease exponentially with time as determined by the RC time constant of the coding network. With the conventional delta system, such errors will be cumulative in view of the fact that each charge is preserved indefinitely due to the linear discharge characteristic function of the coding network employed.

Figure 3A:
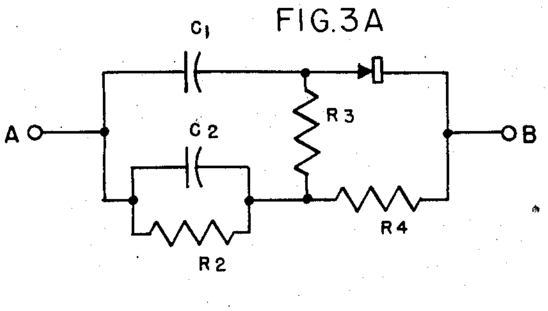
Figure 3B:
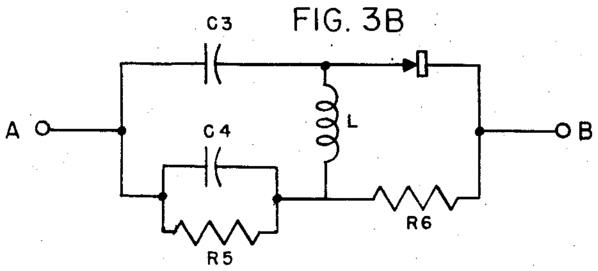

Other types of integrating network which may be used as the coding network are shown in Figs. 3A and 3B. It has been theoretically and experimentally determined that the network shown in Fig. 3A will produce a pulse code such that the $$\text{Pulse Density}=Kf(t)+K_4f'(t)+K_5f''(t)+K_6f'''(t).$$

and Fig. 3B will produce a pulse code such that $$\text{Pulse Density}=Kf(t)+K_4f'(t)+K_5f''(t)+K_6f'''(t)$$

Compared to the coding network of Fig. 3 these circuits provide a better match between the statistical characteristics of the input signal and the statistical characteristics of the transmitted pulse sequence. As a result, better utilization of the maximum information rate which can be transmitted by the pulses is achieved.

Figure 5:
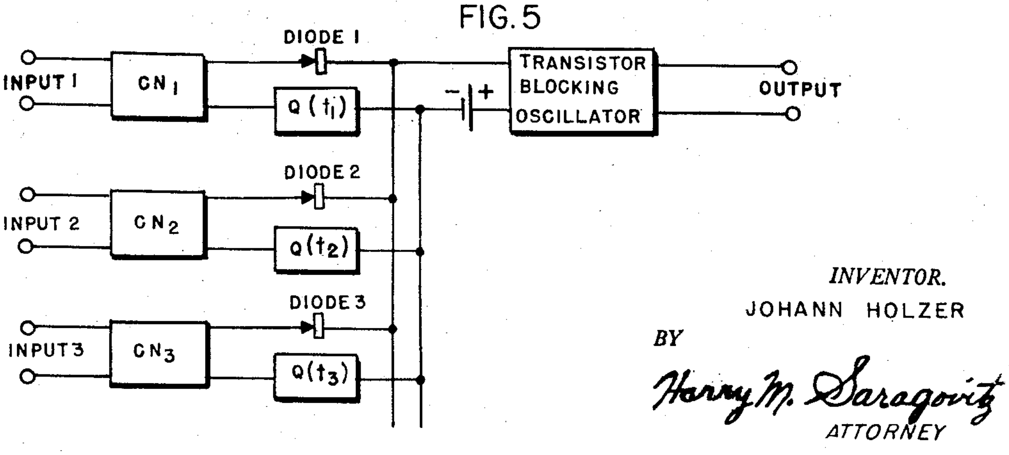
Fig. 5 is a block diagram showing the adaptation of the modulator to a multiplex system utilizing delta-type modulation.

Fig. 5 illustrates a common delta coder wherein one transistor blocking oscillator or pulse current generator as shown in Figs. 1 and 2 may be utilized to encode more than one channel in time sequence. A plurality of coding networks $CN_1$, $CN_2$, $CN_3$, etc. are connected through respective diodes to the blocking oscillator. The coding networks are sampled or quantized in time sequence as hereabove described. Whenever a channel is sampled it is connected to the blocking oscillator through its respective diode and, in the absence of a sampling pulse, the diodes isolate the respective coding networks from the blocking oscillator.

While there has been described what is at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A modulator system comprising, a source of input signal voltage, means for quantizing said input signal voltage in time, a non-linear active device including means for simultaneously generating a voltage pulse at its output circuit and a prescribed current pulse at its input circuit when triggered into conduction by signals of prescribed amplitude, and a passive network responsive to said quantized signal and said generated current pulse whereby said quantized signal periodically samples the voltage developed on said network by said current pulse, said passive network having a prescribed impulse function such that said prescribed amplitude trigger signals are derived from said sampled voltage at the input to said non-linear active device at a rate which is a function of the amplitude and derivatives of said input signal voltage.

2. A modulator system comprising, a source of input signal voltage, a non-linear active device including means for simultaneously generating a voltage pulse at its output circuit and a prescribed current pulse at its input circuit when triggered into conduction, means for quantizing said input signal in time, a passive network connected between the output of the quantized signal and the input circuit of said non-linear device, said network being responsive to said current pulses whereby there is produced across said network a voltage signal having an exponential step function between conduction periods of said non-linear device, and simultaneously responsive to said quantized signal for periodically sampling the exponential voltage signal, said passive network having a prescribed impulse function such that the trigger signals at the input circuit of said non-linear device are derived from said sampled exponential voltage at a rate which is a function of the amplitude and derivatives of said input signal.

3. A modulator system comprising, a source of input signal $f(t)$, means for quantizing said input signal in time in accordance with a signal $+Q(t)$, a non-linear active device including means for simultaneously generating a voltage pulse at its output circuit and a current pulse at its input circuit when triggered into conduction by a trigger signal $g(t)$ greater than a prescribed trigger signal, a passive network in circuit with said input circuit and the quantized input signal, said passive network including means responsive to the current pulses for developing a voltage signal $h(t)$ having a negative polarity with respect to said quantizing signal $Q(t)$ and having exponential voltage steps between conduction periods of said non-linear device, and simultaneously responsive to said quantized signals for periodically sampling the signal $h(t)$ in said network whereby when $-h(t)<[f(t)+Q(t)]$, said non-linear active device is triggered into conduction.

4. A modulator system comprising, a source of input signal $f(t)$, a time quantizing signal $+Q(t)$ applied to said input signal to produce a quantized signal $$[f(t)+Q(t)]$$

a non-linear active device including means for simultaneously generating a voltage pulse at its output circuit and a prescribed current pulse at its input circuit when triggered into conduction by a prescribed input signal $g(t)$ greater than a prescribed trigger signal, a passive network having one end in circuit with the input of said non-linear device and adapted to be charged by said current pulses to develop a voltage signal $-h(t)$ across said network, said voltage signal having exponential voltage steps between conduction periods of said non-linear device, the other end of said passive network being responsive to said quantized signal for periodically sampling the signal $-h(t)$ whereby when $-h(t)<[f(t)+Q(t)]$, said non-linear active device is triggered into conduction.

5. The modulator system in accordance with claim 4 wherein said passive network comprises a resistor and capacitor in parallel circuit arrangement.

6. A modulator system comprising, a source of input signal $f(t)$, a non-linear active device comprising a transistor having a base electrode, a collector and an emitter, means for biasing said emitter and collector in the reverse direction, regenerative coupling means between said collector and said base, whereby when a trigger pulse $g(t)$ greater than a prescribed trigger signal is applied to the emitter, a pulse is generated in the collector circuit and simultaneously a current pulse is developed at the emitter, means for quantizing said input signal in time by a signal $+Q(t)$, a passive network having one end in circuit with the emitter and charged by said current pulses to develop a voltage signal $-h(t)$ across said network, said voltage signal $-h(t)$ having exponential voltage steps between conduction periods of said transistor, the other end of said passive network being in circuit with said quantized signal for periodically sampling the signal $-h(t)$ whereby when $-h(t)<[f(t)+Q(t)]$, said transistor will be triggered into conduction, the recurring rate of said trigger pulses being a function of the amplitude and derivatives of said input signal $f(t)$.

7. The modulator system in accordance with claim 6 wherein said passive network comprises a resistor and capacitor in parallel circuit arrangement.

8. A modulator system comprising, a source of input signal $f(t)$, means for quantizing said input signal in time by a signal $Q(t)$ having a prescribed polarity, a non-linear active device including means for simultaneously generating a voltage pulse at its output circuit and a prescribed current pulse at its input circuit when triggered into conduction, a coding network comprising a resistor and capacitor in parallel circuit arrangement and in circuit with said quantized signal and the input circuit of said non-linear active device, said coding network being responsive to the current pulses to produce a voltage signal $h(t)$ negative with respect to $Q(t)$, said capacitor being charged by said current pulses when the non-linear device is conducting and discharged exponentially through said resistor between conduction periods, and responsive to said quantized signal for periodically sampling the signal $h(t)$ on said RC circuit whereby when $$-h(t)<[f(t)+Q(t)]$$

said non-linear active device is triggered into conduction, the recurring rate of said trigger pulses being a function of the amplitude and first derivative of the input signal $f(t)$.

9. The modulator system in accordance with claim 4 wherein said non-linear device comprises a point contact transistor having an emitter electrode, a base electrode, and a collector electrode, said emitter being connected to said one end of said passive network, and regenerative coupling means between said collector and said base.

References Cited in the file of this patent

UNITED STATES PATENTS

| | | |
|---|---|---|
| 2,662,118 | Shouten et al. | Dec. 8, 1953 |
| 2,721,308 | Levy | Oct. 18, 1955 |

FOREIGN PATENTS

| | | |
|---|---|---|
| 747,541 | Great Britain | Apr. 4, 1956 |

UNITED STATES PATENT OFFICE

Certificate of Correction

Patent No. 2,859,408 November 4, 1958

Johann Holzer

It is hereby certified that error appears in the printed specification of the above numbered patent requiring correction and that the said Letters Patent should read as corrected below.

Column 2, line 59, should read as shown below instead of as in the patent:

the equation $|h(t)|_{max} \geqq |f(t)|_{max}$.

column 5, line 3, should read as shown below instead of as in the patent:

Pulse Density$=Kf(t)+K_2f'(t)+Kf''(t)$

Signed and sealed this 29th day of March 1960.

[SEAL]

Attest:
KARL H. AXLINE,
*Attesting Officer.*

ROBERT C. WATSON,
*Commissioner of Patents.*